Aug. 11, 1970  N. A. NELSON  3,523,600

MODULAR HYDRAULIC CONTROL SYSTEM

Filed Feb. 13, 1968  6 Sheets-Sheet 1

FIG. 1

INVENTOR:
NORMAN A. NELSON
BY James Jackson
AGENT

Aug. 11, 1970  N. A. NELSON  3,523,600
MODULAR HYDRAULIC CONTROL SYSTEM

Filed Feb. 13, 1968  6 Sheets-Sheet 3

INVENTOR:
NORMAN A. NELSON
BY: *James Jackson*
AGENT

United States Patent Office 3,523,600
Patented Aug. 11, 1970

3,523,600
MODULAR HYDRAULIC CONTROL SYSTEM
Norman A. Nelson, Houston Tex., assignor to ACF Industries, Incorporated, New York, N.Y., a corporation of New Jersey
Filed Feb. 13, 1968, Ser. No. 705,057
Int. Cl. F15b 13/08
U.S. Cl. 137—271
16 Claims

ABSTRACT OF THE DISCLOSURE

A hydraulic fluid supply system for a plurality of closely-spaced hydraulically-actuated mechanical devices, which includes a fluid distribution module associated with each of the mechanical devices serving to supply the hydraulic actuator of the mechanical device with energizing hydraulic fluid. The modules also serve to aid in the transfer of hydraulic fluid to other hydraulic actuators and mechanical devices for actuation thereof as well as serving as protective braces for the fluid transferring structure.

BACKGROUND OF THE INVENTION

This application relates generally to valves which are controlled by power operators and more particularly to a modular hydraulic power supply system for controlling a plurality of closely spaced mechanical devices such as the valves and valve operators of a subsea wellhead assembly. Although the invention is not limited to use as a valve operator control nor is limited to use in submerged conditions, it is primarily designed to overcome the hostile conditions which are frequently encountered when valves and valve operator assemblies are adapted for subsea service. For purposes of simplicity, discussion regarding the invention will be directed particularly to valve and valve operator assemblies which incorporate the modular hydraulic power supply system of this invention for submerged application thereof.

When wells for petroleum products, such as crude oil and natural gas, are drilled in the ocean floor, such wells are completed and adapted for production through a wellhead assembly which may be positioned above the surface of the ocean on a platform or the like or may be positioned in submerged condition on the ocean floor. When wells are completed on the ocean floor, it is imperative that the wellhead assembly, which generally includes a number of valves, be provided with valve operators capable of being controlled from a remote location through energization by a controllable power supply system.

When hydraulic power systems are employed for control of remotely located valve operators, generally a pair of hydraulic control lines extend from the power supply source to each of the valves and operators to be controlled. Since a dual completion wellhead assembly may have as many as twelve or more valves and valve operators, it is obvious that many individual hydraulic lines are required for operation and control of the complete wellhead assembly. For installation of the wellhead assembly on the ocean floor, generally all of the hydraulic supply conduits are installed while the wellhead assembly is above the surface of the ocean to obviate the necessity of hydraulic system installation under water. Difficulty arises however when the wellhead system is in need of repair because hydraulic lines frequently must be disconnected and the valve operator must be removed before valve repair or operator repair procedures can be accomplished. Such repair procedures are complicated by the hostile subsea environment in which a diver or a remotely controlled repair device must operate. Repair procedures are further complicated by the fact that it frequently becomes difficult to ascertain which of the many hydraulic lines should be disconnected in order that one or more of the valves and valve operators can be serviced. All of these disadvantages make underwater repair an extremely expensive operation, thereby adversely affecting the feasibility of subsea well completions.

One method utilized to eliminate the maze of hydraulic piping which is frequently found on remotely controlled subsea hydraulic actuators has been to cast the wellhead valve body section sufficiently large so that hydraulic fluid passages may be drilled therein. This feature has the advantage of eliminating possible external damage to the hydraulic system by virtue of the internal hydraulic passages. It is quite obvious, however, that drilling a number of very long passages in a wellhead valve body is quite expensive and it is also obvious that the amount of material required to produce a large wellhead body casting of this nature would quite logically be adverse to the competitive nature of the product. Wellhead systems including internally drilled hydraulic supply passages for control of the valve operators by their very nature are quite inflexible, thereby rendering the possibility of subsequent modification or adaptation virtually impossible.

SUMMARY OF THE INVENTION

The instant invention was developed to promote effective and inexpensive completion of wells on the ocean floor through the provision of externally disposed hydraulic fluid supply structure which is particularly designed to facilitate simple and easy replacement or repair of any part of the valve, valve operator or hydraulic fluid supply structure. The fluid supply apparatus may be very easily removed from the valve and valve operator system simply through removal of one or more bolt-like connection structures. The hydraulic fluid supply systems can be installed or removed very simply through the use of simple tools and equipment. Accordingly, the invention has as its primary object the provision of a novel valve and valve operator structure including a hydraulic fluid supply system therefor which is specifically adapted for subsea service and which may be simply and easily removed for repair or replacement.

Another object of this invention involves the provision of a novel hydraulic fluid supply system for subsea valve and valve operator assemblies whereby fluid connection is established between the fluid supply system and the valve and valve operator assembly by a single bolt which maintains the fluid supply system in mechanical connection with the valve and operator assembly.

It is another object of my invention to provide a novel fluid supply system for subsea valve and valve operator assemblies which includes interchangeable parts and which may be readily adapted or modified as desired, thereby lending flexibility to the system in which the valves and operators function.

Among the objects of my invention is contemplated the provision of a hydraulic fluid supply system for a number of closely spaced valve and valve operator assemblies which, when connected to a structure including the valve and operator assemblies, will provide protection for the fluid supply system from the hazards of hostile subsea environment.

Another object of my invention contemplates the provision of a novel hydraulic fluid supply system utilizing symmetrical parts which are capable of being substituted one for the other or reoriented to lend flexibility to the system.

It is an even further object of my invention to provide a novel hydraulic fluid supply system for a number of closely spaced valves and valve operator assemblies which is simple in nature, low in cost, and reliable in use.

The novel features of the present invention are set forth with particularity in the appended claims. The present invention, both as to its organization and manner of operation together with other and further objects and advantages thereof, may be best understood by way of illustration and example of certain preferred embodiments when taken in conjunction with the accompanying drawings in which:

Figure 1:
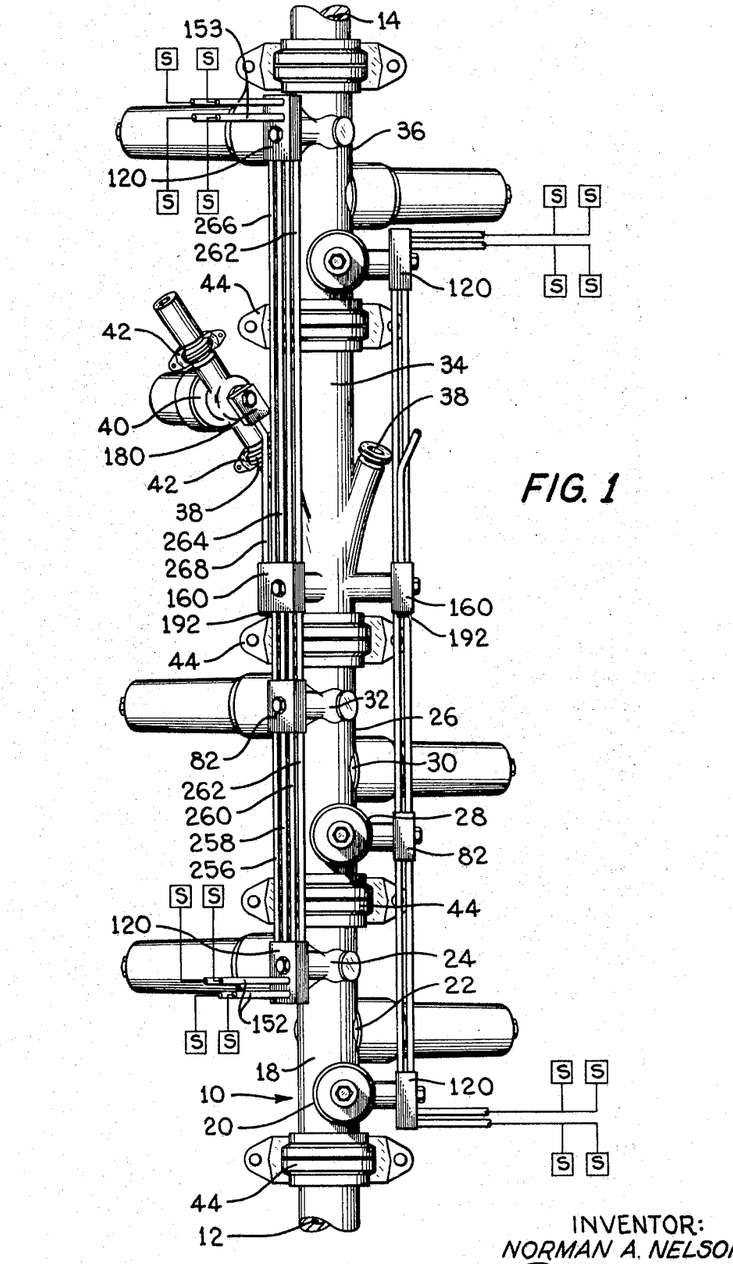
FIG. 1 is a perspective view of a portion of a dual completion wellhead provided with valves and valve operator assemblies and including a hydraulic fluid supply system constructed in accordance with the present invention.
Figure 2:
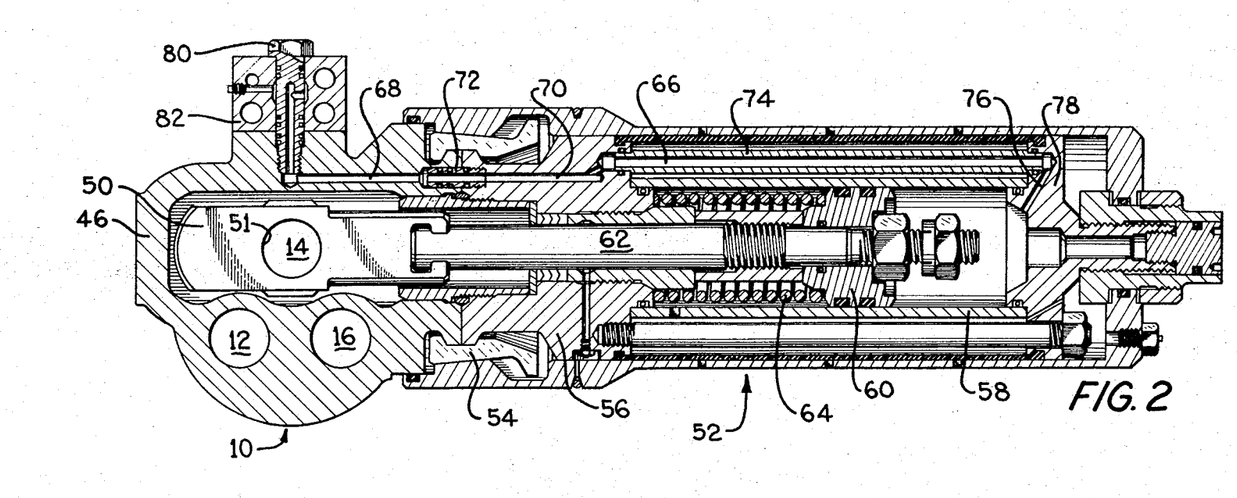
FIG. 2 is a sectional view taken through a wellhead valve section and illustrating one of the valve and operator assemblies of FIG. 1 and its associated hydraulic fluid supply module.

Referring now to the drawings for a more detailed description of the invention, in FIGS. 1 and 2 there is shown a wellhead valve assembly 10 for a dual completion type wellhead having three flow passages 12, 14 and 16. The flow passages communicate with tubing strings extending to two producing zones beneath the surface of the earth. One of the flow passages communicates with the casing surrounding the tubing and serves as a fluid return passage to allow the circulation of fluid when oil tools and other devices are forced into and out of the tubing strings by fluid pressure. Each of the valve sections which compose the valve assembly 10 includes a conduit for each of the strings of tubing, each conduit in the section being controlled by a valve. For example, a bottom master section 18 of the valve assembly includes master valves 20, 22 and 24 for controlling the flow of fluid through the individual fluid passages. The wellhead valve assembly 10 also includes a top master section 26 which includes three top master valves 28, 30 and 32 for controlling the flow of fluid through the flow passages 12, 14 and 16. Ordinarily, the bottom master valves 20, 22 and 24 remain in an open condition and are closed only in event of emergency so that positive shutoff of the wellhead can be assured at all times.

As is generally the case, the wellhead valve assembly is also provided with a wing valve section 34 and a swab valve section 36, each which includes one valve for each of the three flow passages. The wing valve section includes three branch conduits 37, each which communicates with one of the three fluid passages extending through the wing valve section. Each of the branch conduits is provided with an integral flange 38 to which is connected a valve and valve operator assembly 40 by means of clamps 42. The wing valve section includes three valve and operator assemblies, although for purposes of simplicity and to eliminate possible confusion, only one of the wing valves and its associated operator is shown. The various sections of the valve assembly may be connected by means of flanges and clamp structures such as that shown at 44, although other acceptable means of connecting the valve sections are contemplated within the spirit and scope of the instant invention.

Referring now to FIG. 2, each of the valves comprises a body section 46 defining a valve chamber 48. The valve chamber 48 is disposed in fluid communication with one of the flow passages of the wellhead valve assembly 10 such as the flow passage 14 for example. A gate member 50 is movably disposed within the valve chamber 48 and is movable between an open position, where a port 51 in the gate 50 is disposed in registry with the flow passage thereby allowing the flow of fluid through the conduit 14 and a closed position where the conduit 14 is effectively blocked by the gate 50.

A valve operator shown generally at 52 is connected to the valve body 46 by means of segment clamps 54 which maintain flanges on the valve body and an operator base 56 is sealed abutting relation. The valve operator is of the linear hydraulic type including a hydraulic cylinder 58 in which is disposed a movable piston member 60. The piston member 60 is connected by means of a valve stem 62 to the gate member 50 in such manner that reciprocating of the piston member 60 induces reciprocal movement of the gate member between its open and closed positions. A compression spring member 64 is interposed between the piston 60 and the valve operator base 56 and serves to bias the piston member outwardly away from the valve body.

To provide for energization of the hydraulic valve operator, the valve and operator assembly is provided with a hydraulic fluid supply passage system 66 which includes a fluid passage 68 in the valve body and a fluid passage 70 formed in the operator base 56. The passages 68 and 70 are maintained in fluid communication through a connector tube 72 which establishes a sealed bridge between the valve body and operator base when the same are disposed in assembly. Hydraulic fluid from the passage 70 is communicated into a fluid passage defined by a tubular conduit member 74 which connects the operator base passage with a fluid passage 76 formed in the end cap 78 of the hydraulic operator. For energization of the hydraulic operator 52, hydraulic fluid from a hydraulic fluid source is conducted through the valve and operator passage structure and is introduced into the cylinder 58 outwardly of the piston 66. Introduction of hydraulic fluid into the cylinder 58 outwardly of the piston 60 will cause the piston to move inwardly toward the valve body 46, thereby compressing the spring 64 and causing the valve stem 62 and the gate element 50 to be moved to a position aligning the port 51 in the gate 50 with the production flow passage 14 of the wellhead assembly. To close the valve, it is necessary that the hydraulic fluid supply system be controlled in such manner as to allow hydraulic fluid to flow freely out of the cylinder 58 and through the hydraulic fluid system 66. When this occurs, the combined effect of the compression spring 64 and fluid pressure acting through the area defined by the stem 62 causes the stem and piston structure to be positively urged outwardly away from the valve body thereby moving the gate member 50 to its closed position and blocking the flow of fluid through the fluid passage 14 of the wellhead assembly.

For the purpose of supplying hydraulic fluid under pressure to the hydraulic fluid system 66 of the operator and valve combination, one of several fluid supply module devices is connected to the valve body 46 by means of a bolt device 80. The bolt 80, in addition to fixedly connecting the module to the valve body, also establishes fluid communication between the module and the hydraulic fluid system 66 of the valve and operator assembly. For example, as shown in FIG. 2, an intermediate fluid supply module 82 is connected by the bolt 80 to the valve body 46.

Each of the various fluid supply modules is of symmetrical configuration so that the module may be oriented in any number of positions to align a specific passage therein with a selected fluid transfer conduit. For example, the intermediate module 82 shown particularly in FIG. 11 may be rotated 180° about the bolt 80 to communicate the fluid passage therein with a conduit on the opposite side thereof. The module may also be reversed or reversed and rotated 180° to orient the fluid passage thereof in various selected positions. This feature allows the use of relatively few different types of parts to achieve a wide range of flexibility in the fluid supply system. This feature also promotes adaptation and expansion of the fluid supply system without involving change in the valve structure and without the necessity of providing special parts.

Figure 6:
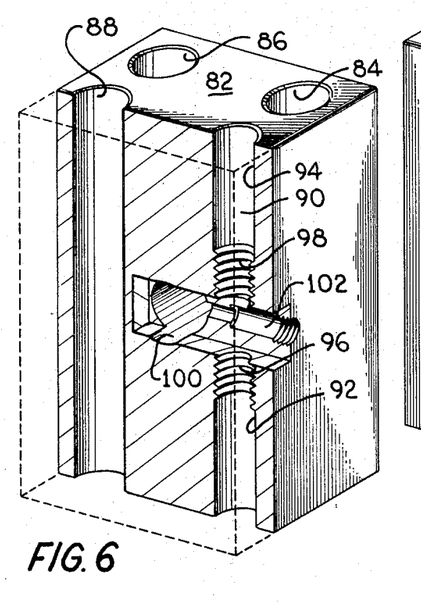
FIG. 6 is a perspective view of the output module of FIG. 1 having a portion thereof broken away and shown in section.

The intermediate module 82 as shown in FIG. 6 comprises a generally rectangular structural block having three cylindrical guide passages 84, 86 and 88 extending therethrough. The passages 84, 86 and 88 merely serve as protective guides for tubular conduits extending through the module 82 thereby giving the tubular conduits an extremely rigid character to protect the conduits from external damage. A hydraulic fluid passage 90 extends through the module 82 in substantially parallel alignment with the cylindrical guide passages and is provided with generally cylindrical sealing surfaces 92 and 94 at each extremity thereof. The hydraulic fluid passage 90 is provided with threads 96 and 98 disposed inwardly respectively of the cylindrical sealing surfaces 92 and 94 which receive the threaded extremities of fluid transfer conduit. The module 82 is also provided with a transverse connection passage 100 defining cylindrical sealing surface walls. The connection passage 100 is maintained in fluid communication with the fluid passage 90 by means of a passage 102 which intersects the passages 90 and 100. The outer extremity of the bore defining the passage 102 is provided with internal threads to receive an externally threaded plug forming a closure therefor.

Figure 3:
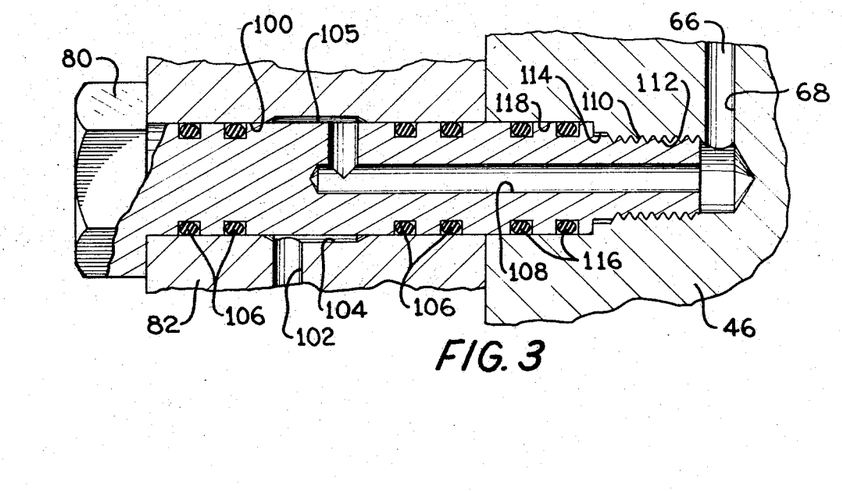
FIG. 3 is a fragmentary sectional view of the hydraulic fluid supply module of FIG. 2 illustrating the fluid connection between the module and the valve body in detail.

Referring now to FIG. 3, transverse connection passage 100 is provided with an internal enlargement 104 which cooperates with the cylindrical surface of the bolt 80 to define an annular chamber 104 surrounding the bolt. Sealing means 106 are provided to establish sealing engagement between the bolt member and the module 82 on each side of the annular enlargement 104 to serve the dual purpose of confining the hydraulic fluid to the annular chamber and preventing contamination of the hydraulic fluid by the external environment. The sealing means 106 may comprise O-rings such as shown in FIG. 3 or may comprise any other conventional sealing means without departing from the spirit or scope of the instant invention. The bolt member 80 is provided with a fluid passage 108 which establishes communication between the annular chamber 105 and the fluid supply passage 68 of the hydraulic fluid system 66.

Figure 10:
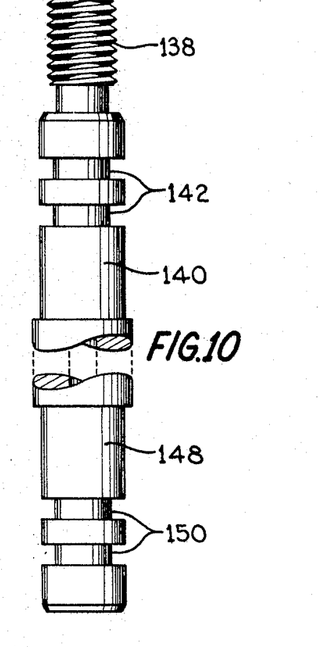
FIG. 10 is a partial elevational view of a fluid transfer conduit of the modular hydraulic fluid system illustrating the end connections thereof in detail.

For physical connection of the bolt 80 to the valve body 46, external threads 110 are provided on the bolt 80 and are received by an internally threaded portion 112 of a connection aperture 114. Sealing means 116 which may be an O-ring type sealing member or any other suitable sealing means are carried by the bolt member 80 to provide sealing engagement between the bolt member and a cylindrical surface 118 defining the outer portion of the connection aperture 114. The sealing member 116 prevent leakage of hydraulic fluid from the hydraulic fluid system in the valve body 46 and also prevents the introduction of corrosive fluid from an external environment such as seawater. The hydraulic fluid supply system includes a number of different modules, one of which being an input module 120 illustrated in FIG. 4. The input module 120 includes internally threaded apertures 122, 124, 126 and 128, each which is disposed in fluid communication with one of four generally parallel bores formed therein. The input module 120 will be fixed to a valve body in the same manner as is the intermediate module 82 shown in FIG. 2. A passage 130 is formed in the input module 120 and establishes fluid communication between one of the parallel bores and the transverse connection passage 132. It is pointed out that the connection passages of each of the various modules are provided with an internal enlargement defining an annular chamber about the bolt member which affixes the module to the valve body structure essentially as illustrated in FIG. 3. Each of the generally parallel passages or bores in the input module 120 is provided with internal threads such as shown at 134 and 136 in FIG. 4, which receive the externally threaded extremity 138 of a fluid transfer conduit 140 as shown in FIG. 10. The fluid supply conduit 140 includes annular grooves 142 which receive sealing means such as O-rings for the establishment of a seal between the conduit 140 and the sealing surfaces defined by the cylindrical outer portions 144 and 146 of the parallel bores.

Figures 8, 10A:
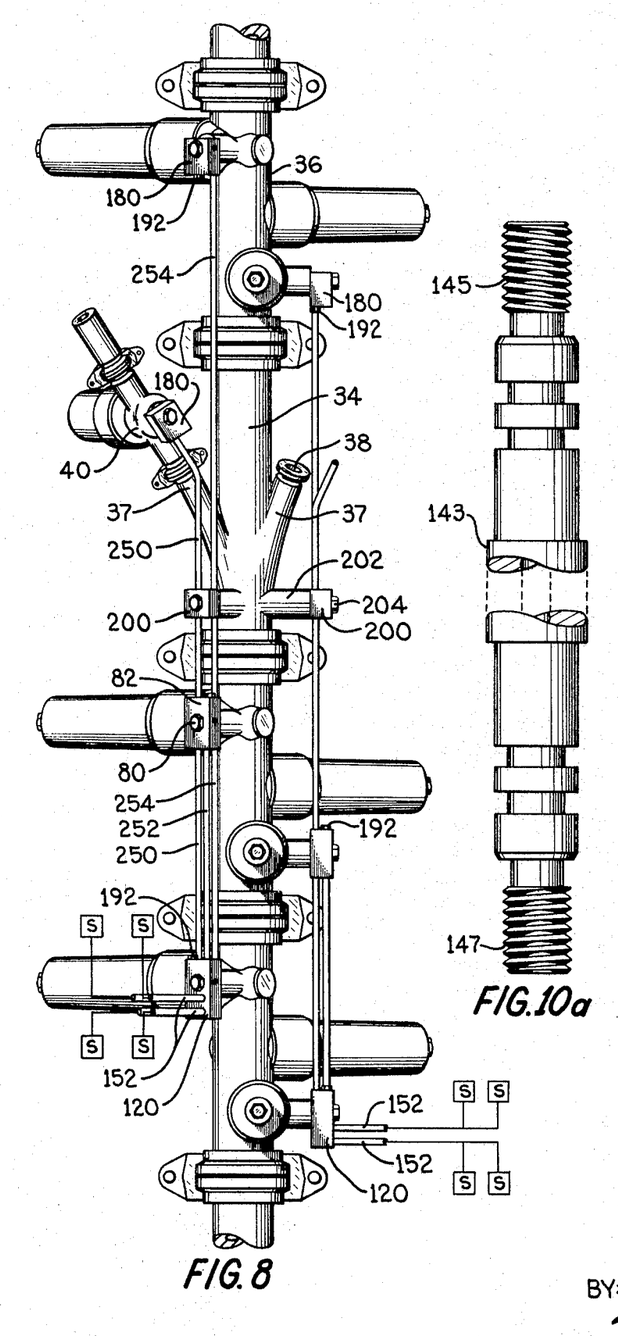
FIG. 8 is a perspective view of a wellhead valve assembly which is adapted for single station hydraulic control through utilization of modular components.
FIG. 10a is a partial elevational view of a modified fluid transfer conduit having right hand threads at one extremity and left hand threads at the other extremity thereof.

Also as shown in FIG. 10, the fluid transfer conduit 140 may include a generally cylindrical extremity having a pair of grooves formed therein for receiving sealing members such as O-rings. The cylindrical extremity 144 is merely received in rather close relationship within the cylindrical outer portions 144 and 146 of the parallel bores of the input module. Sealing engagement between the cylindrical surfaces 144 and 146 of the module and the cylindrical extremity 148 of the conduit 140 is established by means of the O-rings 150. Ordinarily, the fluid transfer conduits 140 will be provided with a threaded end and a non-threaded end so the threads may be made up with the parts of the fluid supply system in assembly with the wellhead valve body structure. As an alternative, the conduits may be provided with two non-threaded extremities which are received in sealed relation within the module passages. The modules in this case will retain the conduits in the proper position. As a further alternative as shown in FIG. 10a, conduits 143 may be provided with a right hand thread 145 at one extremity and a left hand thread 147 at the other so that the threads may be made up simultaneously with two modules in a turnbuckle-like manner. This method of connection would allow optimum positioning of the modules prior to asscembly of the modules to the wellhead valve structure.

Figure 4:
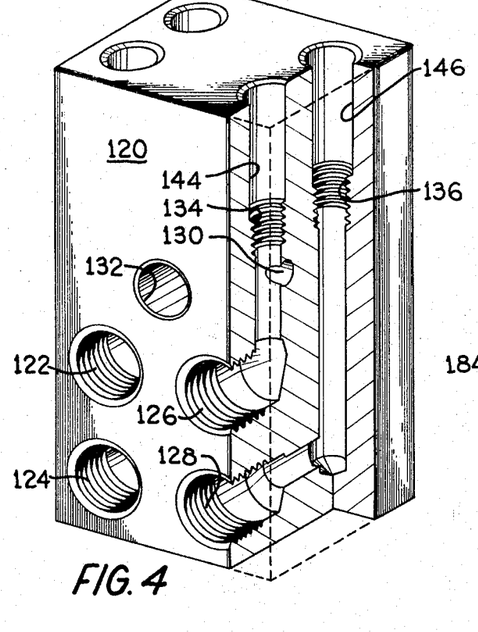
FIG. 4 is a perspective view of an input module of the fluid supply system of FIG. 1 having a portion thereof broken away and shown in section.

Hydraulic fluid is supplied into the input module 120 by means of hydraulic supply conduits, one which is received in each of the threaded apertures 122, 124, 126 and 128 of the input module. The supply conduits 152 are in turn communicated with controllable sources of hydraulic fluid under pressure.

Figure 7:
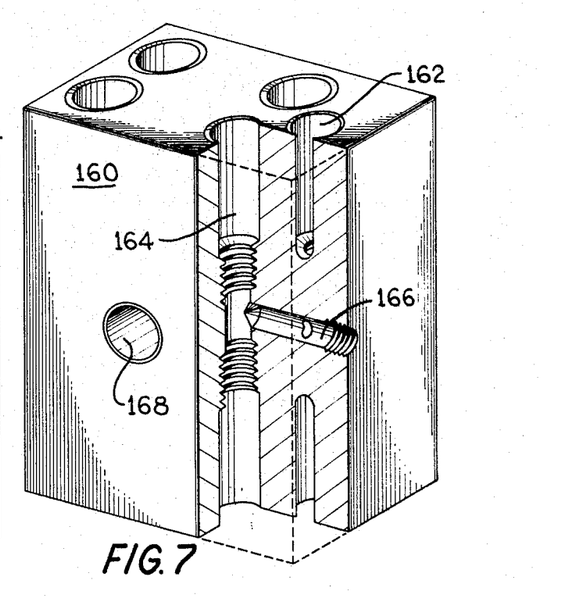
FIG. 7 is a perspective view of the lateral hydraulic fluid supply module of FIG. 1 having a portion thereof broken away and shown in section.

The hydraulic fluid supply system also includes a lateral module 160 which, in addition to having three parallel guide bores and a fluid supply bore like the intermediate module, also includes a lateral fluid supply bore 162 which is configured substantially identically with the main fluid passage 164. A transverse passage 166 intersects both of the passages 162 and 164 and also establishes communication of these passages with the connection passage 168. The lateral module is utilized only when the valve and valve operator assemblies are provided with dual station supply such as illustrated in FIG. 1. This feature allows the valves and operators to be controlled remotely by a primary source of fluid supply and event of failure of the primary source of supply fluid pressure from a secondary fluid supply source may be utilized to control the operators. For example, a secondary source of supply might be provided by a portable supplemental supply source which is connected to an input module by a diver gaining access to the wellhead assembly or the secondary source of hydraulic fluid supply might be permanently connected to an input module of the system. For example, as illustrated in FIG. 1, the lower input modules 120 may be connected with a controllable primary source of supply and the upper input modules 120 may be provided with a secondary source of supply.

Figure 5:
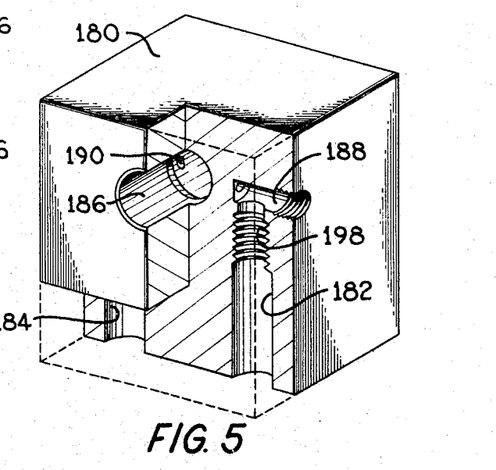
FIG. 5 is a perspective view of the terminal module of the hydraulic fluid supply system having a portion thereof broken away and shown in section.

With reference to FIG. 5, the hydraulic fluid supply system of my invention also includes a terminal module 180 which is utilized for both single station and dual station hydraulic control. The terminal module 180 has a pair of generally identical bores 182 and 184 which are disposed in substantially parallel relationship and which are communicated with a connection passage 186 by transverse connection passages 188 and 190. The transverse connection passages 188 and 190 are closed with threaded plug members in the operative condition thereof to prevent the introduction of corrosive fluid into the hydraulic fluid supply system. The terminal module 180 is connected to a valve body by a bolt 80 in the same manner as described above according to FIG. 3. Although the terminal module 180 is connected to a single fluid supply conduit in the operative position thereof, the bores 182 and 184 allow flexibility of the hydraulic fluid supply system by allowing various orientations of the terminal module 180. The unused one of the bores 182 or 184 is closed by means of a bolt member 192 illustrated in FIG. 9.

Figure 9:
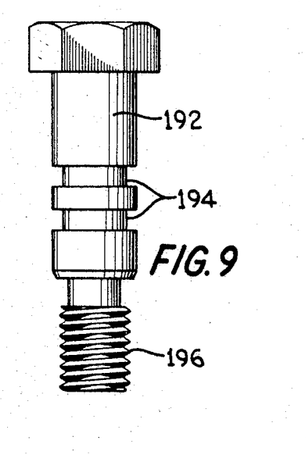
FIG. 9 is an elevational view of a closure plug which is received within hydraulic flow passages of the modules.

The bolt members 192 have a terminal configuration substantially identical to the terminal configuration of the tubular conduits 140. O-ring members or other sealing means are received within annular grooves 194 formed in the bolts to establish a sealed relation with the cylindrical surface of the bores 182 and 184. External threads 196 are provided at the extremity of the bolt member 192 for threaded engagement with internal threads 198 forming portions of the bores 182 and 184. Since the fluid supply passages of each of the modules is of identical size and configuration, bolts 192 may be received in any of the modules to form a closure for one extremity of the fluid supply passage. For example, the lateral module 160 illustrated in FIG. 1 is connected by way of conduits which extend from the upper extremity of the lateral passage to the lower extremity of the terminal module 180 on the wing valve 40. The lower extremity of the lateral fluid supply passage therefore would be closed by means of a bolt 192 which is threadedly received therein.

When the fluid supply conduits must span a considerable distance between modules, a guide module 200 shown in FIG. 8 is provided for connection to a guide module boss 202 by means of a bolt 204, which may be any standard machine bolt. The guide module 200 includes a plurality of cylindrical guide passages through which the supply conduits extend thereby maintaining the rigid character of the fluid supply system and protecting the conduits against external damage.

Figure 11:
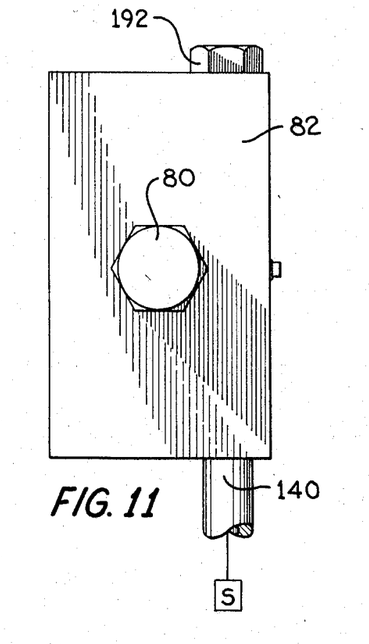
FIGS. 11 and 12 are elevational views (FIG. 12 being shown partially in section) of an intermediate module of the hydraulic fluid control system illustrating a supply conduit entering one extremity thereof and a closure bolt closing the upper extremity of the fluid passage thereof.
Figure 12:
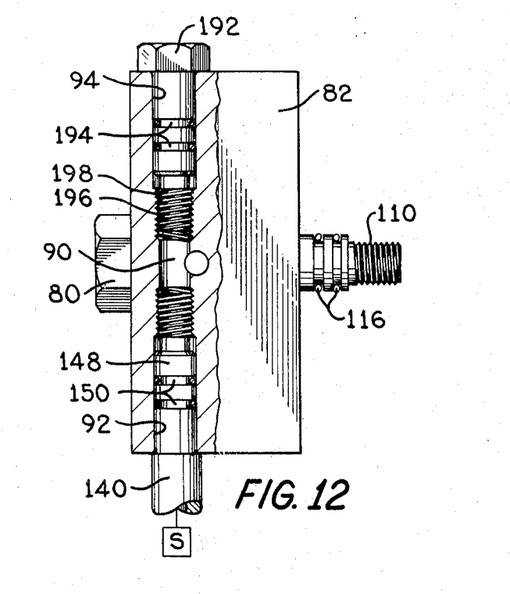

As shown in FIGS. 11 and 12, an intermediate module 82 is shown in elevation, FIG. 12, being broken away and illustrated partially in section to show the relationship of the fluid supply conduit 140 and the closure bolts 192 to the fluid passage of the module. FIGS. 11 and 12 illustrate a tubular conduit 140 being received within the lower portion of the fluid passage of the module 82. The O-ring members carried within the annular grooves 150 of the cylindrical extremity 148 of the conduit 140 effectively establish a sealed relationship between the conduit 140 and the cylindrical wall 192 of the module 82. At the upper extremity of the module 82, a bolt 192 is received within the fluid passage having the externally threaded portion thereof received by the internal threads 198 formed in the fluid passage. O-ring sealing members carried within the annular grooves 194 of the bolt 192 effectively establish a sealed relationship between the closure bolt and the cylindrical wall 94 of the intermediate module 82. The connection bolt member 80 extends through the module 82 in the manner shown and described above in regard to FIG. 3.

Figure 13:
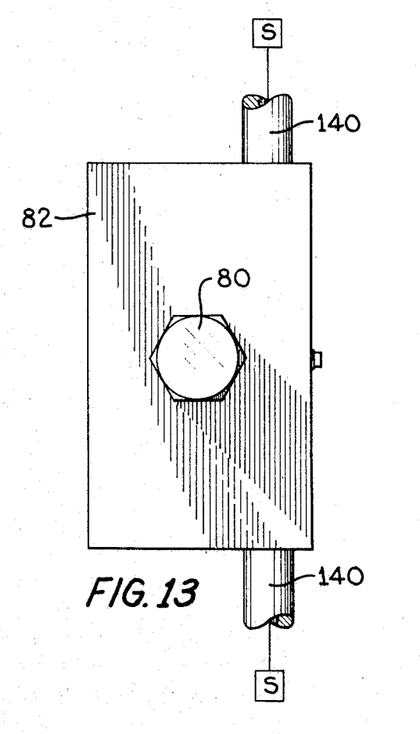
FIG. 13 is an elevational view of an intermediate module of the hydraulic fluid control system showing adaptation of the module for primary and secondary supply for hydraulic fluid to a valve and valve operator assembly.

FIG. 13 illustrates connection of the intermediate module 82 for dual station fluid supply in accordance with the hydraulic fluid supply system illustrated in FIG. 1. The conduits 140 which may have either threaded extremities or non-threaded cylindrical extremities in accordance with FIG. 10, as well as right and left hand threads as shown in FIG. 10a, are received within each extremity of the fluid supply passage of the module 82. Hydraulic fluid under pressure may be supplied from either of the sources S to the fluid supply passage of the module 82 for operation of the valve and valve operator assembly associated therewith from either a primary or secondary fluid supply source.

Figures 14, 15:
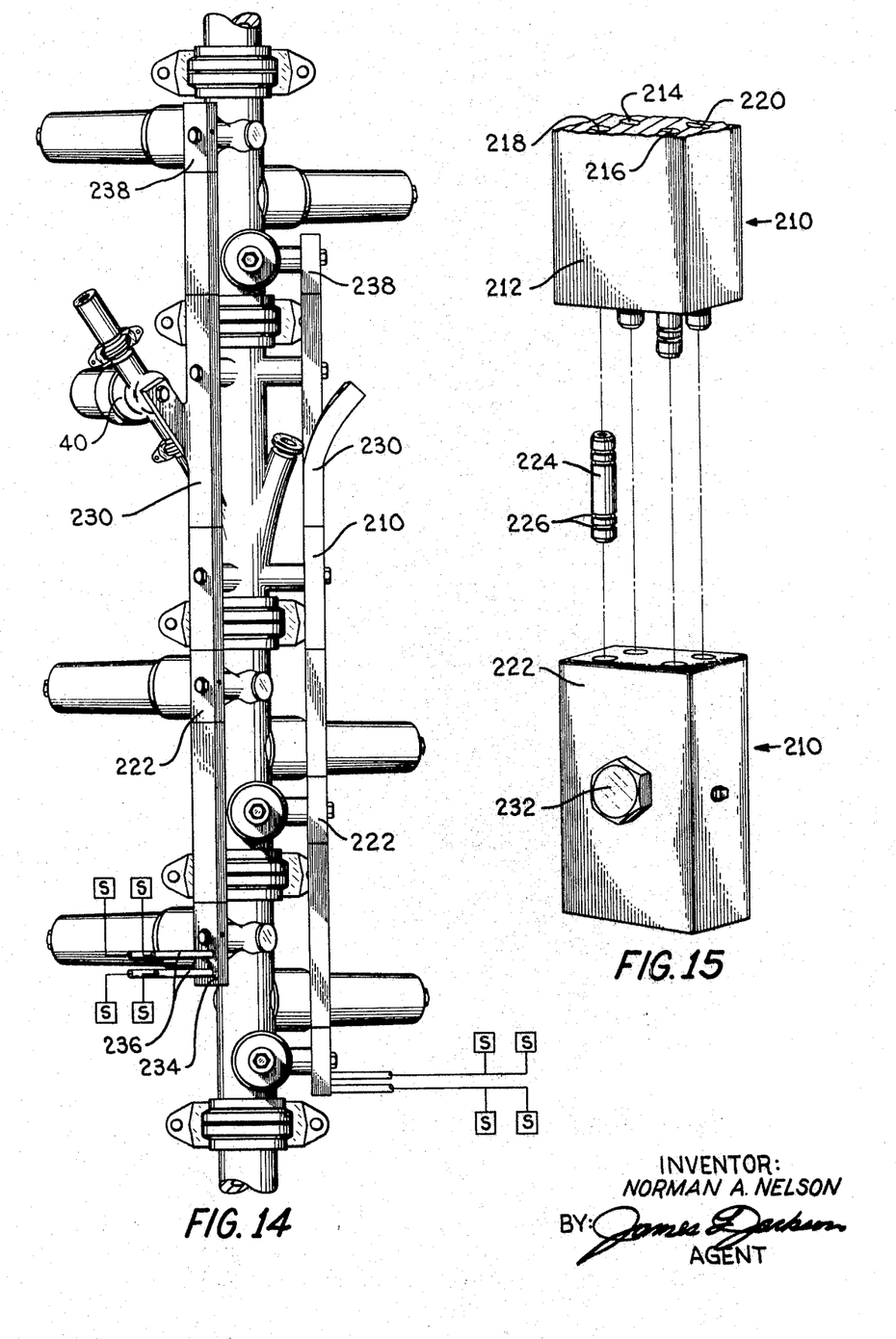
FIG. 14 is an elevational view of a wellhead valve assembly illustrating a modified embodiment of the hydraulic fluid supply system of my invention.
FIG. 15 is a fragmentary sectional view of a portion of the fluid supply system of FIG. 14 illustrating the unit connection structure and fluid communication structure thereof in detail.

Referring now to FIGS. 14 and 15, in the event the fluid supply structure of the valve and operator assembly is subject to damage by severe external forces, the tubular hydraulic supply conduits may be eliminated and the pressurized hydraulic fluid may be supplied to the selected valve and operator assemblies through extremely rigid fluid supply structure 210. The fluid supply structure 210 is illustrated in the form of rectangular elements, but such rectangular configuration is not material since other configurations may be employed within the spirit and scope of the instant invention. The fluid supply structure 210 includes transition members 212, each of which is provided with a plurality of passages such as illustrated at 214, 216, 218 and 220 in FIG. 15. The fluid supply passages in the transition members 212 communicate with fluid supply passages which are formed in module sections 222. Connection between the module sections and the transition members is provided by means of tubular pin members 224 which are received in sealed relation within corresponding apertures in the transition members and the modules. The pin members 224 may be provided with plain cylindrical ends having grooves formed therein for receiving sealing means such as O-rings or one of the extreme portions of the connecting pin 224 may be threaded for threaded reception thereof into a threaded aperture formed either in the modules 222 or in the transition members.

Each of the module sections 222 is connected to the associated valve body structure by means of bolts 232, which in addition to mechanically fixing the module to the valve body also establish fluid communication between the module and the hydraulic fluid supply system of the associated valve body. The bolt members 232, therefore, may be of identical configuration with respect to the bolt structure 80 shown in FIG. 3. The internal configuration of the intermediate module illustrated in FIGS. 14 and 15 corresponds essentially to the module illustrated in FIG. 8. The lower input module provides for communication of the hydraulic fluid system to a fluid supply source through four fluid supply conduits 236. The internal configuration of the input module 234 is essentially the same as discussed above in regard to the input module 120. Likewise, the internal configuration of the terminal modules 238 correspond to the internal configuration of the terminal module illustrated in FIG. 5 respectively as far as internal fluid supply structure is concerned.

OPERATION

With reference now to FIGS. 1 and 8, it should be noted that three separate fluid supply systems are provided for control of the valve and operator assemblies of the wellhead. Each of the fluid supply systems is adapted for control of a bottom master valve, a top master valve, a wing valve, and a swab valve. Since each of the wellhead valve assemblies includes three separate hydraulic fluid supply systems, operation of only one of these systems will be discussed in detail. With reference particularly to the single station control illustrated in FIG. 8, hydraulic fluid flowing from a controllable hydraulic power source S enters the input module 120 by way of the four supply conduits 152. One of the conduits 152 communicates directly with the valve and operator assembly to which the module 120 is attached by virtue of communication between the input aperture 126 and the connection passage 132 as described above in accordance with FIG. 4. A closure bolt such as that shown at 192 in FIG. 12 will close the upper extremity of the fluid supply passage communicating with the connection passage 132. Three fluid transfer conduits 250, 252 and 254 are received within the other three apertures in the input module 120 and extend upwardly to other modules of the hydraulic fluid supply system. The conduit 252 extends between the input module 120 and the intermediate module 82 to establish hydraulic fluid communication between the input module and the hydraulic fluid system of the intermediate module 82. The conduit 252 may be threaded at one extremity such as shown in FIG. 10 and the threaded extremity may be received either in the input module 120 or the intermediate module 82. As an alternative, the conduit 252 may have cylindrical extremities at each end such as that shown at the lower portion of FIG. 10, thereby causing the conduit 252 to be supported between the input and intermediate module. As a further alternative, the conduit 252 may be provided with right-hand threads at one extremity thereof and left-hand threads at the other exremity, thereby allowing the conduit to be threaded into both the input and intermediate modules in a turnbuckle-like manner, thereby allowing the conduit to serve as a spacing adjustment turnbuckle member for achieving proper spacing between the modules. The conduit 250 extends from the input module 120 through cylindrical guide bores defined in the intermediate module 82 and the guide module 200 and is received at the other extremity thereof within the fluid passage of the terminal module 180. The conduit 254 extends from the guide module 120 through cylindrical guide bores in the intermediate module 82 and the guide module 200 and is received in fluid communication by the terminal module 180 on the swab valve of the wellhead valve system.

With reference now to FIG. 1, a dual station hydraulic supply system comprises input modules 120 which are fixed both to the lower master valves and to the swab valves of the wellhead valve assembly. For dual station operation of one of the bottom master valves of a wellhead valve assembly, the fluid supply conduits 152 communicate directly with the fluid supply system of the lower or master valve input module 120 in the manner described above in accordance with FIG. 4. A fluid transfer conduit 262 extends from the upper or swab valve input module 120 through cylindrical guide bores in the lateral module 160 and the intermediate module 82 and has the lower extremity thereof received in fluid communication within the aperture 144 of the lower input module. Hydraulic fluid from a controllable primary fluid supply source S may be introduced into the fluid system of the bottom master valve through the supply conduits 152 to achieve primary control of the bottom master valve. For secondary or alternate control of the bottom master valve, hydraulic fluid under pressure may be supplied to the upper or swab valve input module from an alternate fluid supply source S. The fluid is then transferred from the upper input module to the lower input module through the fluid transfer conduit 262 which communicates directly with the fluid passage 144 of the lower input module. It is readily apparent, therefore, that valve and valve operator assemblies of wellhead valve assemblies may be provided with single station control or dual station control with no internal changes in the wellhead valve system. Moreover, the fluid supply systems are readily convertible from single station to dual station control without involving any internal changes in the structure of the wellhead assembly and with only minor changes in the nature of substitution of components as far as the fluid supply system is concerned.

For dual station control of one of the top master valves of a wellhead valve assembly, a conduit 258 extends from the lower input modules and is received in fluid communication within the lower portion 92 of the fluid passage 90 in the intermediate module. A separate fluid transfer conduit 264 extends from one of the hydraulic fluid passages, for example the passage 146 of the upper input module 120, and extends through a cylindrical guide bore in the lateral module 160. The lower extremity of the conduit 264 is received in fluid communication within the upper portion of the fluid supply passage 90 in the intermediate module 82 in the manner shown above in FIG. 13. The wellhead valve 132 may be actuated by controlling fluid supplied either from the lower primary fluid supply or from the upper or secondary hydraulic fluid source.

For dual station control of one of the wing valves 40 of the wellhead valve assembly, hydraulic fluid is supplied to the fluid supply passage 164 of the lateral module 160 through a fluid transfer conduit 256 which is received in sealed fluid communication within the lower input module 120, passes through a cylindrical guide bore in the intermediate module 82 and has the upper extremity thereof received in sealed fluid communication within the fluid passage 164 of the lateral module. A separate fluid transfer conduit 266 extends from the upper input module 120, and has the lower end thereof received within the fluid supply passage 164 of the lateral module. The lower extremity of a conduit 268 is received within the upper portion of the lateral bore 162 of the lateral module 160 while the upper extremity thereof is received within a fluid supply passage 184 in the terminal module 180. To seal the fluid supply system, the remaining passage 182 of the terminal module 180 and the lower portion of the lateral fluid passage 162 are closed by closure bolts 192.

For control of a swab valve of the wellhead valve assembly, the upper input module 120 is communicated directly into the hydraulic fluid system 66 of the swab valve and operator assembly as described above in accordance with FIG. 4. A conduit 262 is received in fluid communication within both the upper and lower input modules 120 and extends through guide bores formed in the intermediate module 82 and the lateral module 160. The swab valves, therefore, are subject to control by fluid from either the primary or secondary sources of controllable hydraulic fluid.

It is readily apparent, therefore, that each of the wellhead valves controlled by the hydraulic fluid supply system according to this invention may be subject to control from both primary and secondary sources of fluid supply if the fluid supply system is adapted for dual station control. In the event the primary source of fluid supply becomes inoperative or damaged, a secondary source of supply of any desired type may be effectively employed to achieve operation of the wellhead valves.

An important aspect of my invention concerns the flexibility of design and adaptability of the system to change, which is effectively promoted through use of the modular system of my invention. For example, the intermediate and lateral modules shown in FIGS. 6 and 7 may be oriented in a number of positions to align various conduits with the fluid supply system of the module. Moreover, the lateral module and the intermediate module are interchangeable in the event that expansion of the fluid supply system is desired. Conversion of the fluid supply system of this invention from single station control to dual station control is readily accomplished by mere substitution and/or reorientation of the modules and fluid transfer conduits. Where conduits are removed, unused fluid passages may be sealed by merely inserting closure bolts 192 therein. Because the fluid supply modules are of symmetrical configuration, they are subject to positioning in a number of different orientations thereby lending the system a wide range of flexibility so that alterations, conversions and expansion of the fluid supply system may be accomplished with minimum expenditure of time, money and equipment.

It is evident from the foregoing that the provision of a hydraulic fluid supply system constructed in accordance with the spirit and scope of my invention effectively achieves flexibility of design which heretofore has not been possible. Incorporation of my invention in a valve assembly for a wellhead system allows the valves of the wellhead system to be individually controlled from primary or secondary sources of fluid suppy without involving the necessity of providing a maze of hydraulic fluid conduits such as are frequently found in remotely controlled wellhead valve assemblies of this nature. My invention effectively achieves simplicity of installation through the provision of modular connection structure which is capable of being installed without the necessity of special tools. The simplicity in design of my hydraulic fluid supply system and the ease with which installation procedures are accomplished effectively promote the installation and repair or replacement of components of the fluid supply system under adverse conditions such as might be found about submerged wellhead assemblies. The tubular fluid transfer conduits provided to conduct hydraulic fluid between the various modules of my invention are effectively protected from damage by external elements since the same are given substantial rigidity by guide apertures formed in the various modules and by placement of guide modules when the tubular conduits must span considerable distances. The simplicity in design and low cost aspect of the connection structures of the fluid supply system effectively promote the competitive nature of my invention. It should be noted that although my invention is particularly directed to the control of wellhead valve and valve operator assemblies that such use of my invention is not to be considered as limiting. It is obvious that my invention may be used for control of a wide vairety of hydraulically actuated mechanical structures which may be positioned in close proximity either in submerged or non-submerged condition. It is, therefore, evident that my invention is one well adapted to attain all of the objects hereinabove set forth together with other advantages which will become obvious and inherent from a description of the apparatus itself. It will be understood that certain combinations and subcombinations are of utility and may be employed without reference to other features and subcombinations. This is contemplated by and is within the scope of the appended claims. As many possible embodiments may be made of the invention without departing from the spirit or scope thereof, it is to be understood that all matters hereinabove set forth or as shown in the accompanying drawings are to be interpreted as illustrative and not in a limiting sense.

I claim:

1. A wellhead valve structure comprising a plurality of valves for controlling the flow of well fluid, each of said valves having a hydraulic operator therefor, inlet passages formed in each of said valves for introduction of hydraulic fluid to said operators, a plurality of modules disposed one adjacent each of said valves, each of said modules having at least one hydraulic fluid passage formed therein, bolt means extending through said modules and establishing fluid communication between said hydraulic fluid passage and the inlet passage of the associated valve, means connecting said modules with a controllable source of fluid pressure whereby hydraulic fluid under pressure may be introduced from said source through said modules for control of said valves.

2. A wellhead valve structure as set forth in claim 1, said modules each having a transverse connection bore extending therethrough, a passage within each of said modules establishing fluid communication between said transverse connection bore and said hydraulic fluid passage of said module and said bolt means extending through said transverse connection bore and establishing fluid communication between said transverse bore with said inlet passage of the associated valve.

3. A wellhead valve structure as set forth in claim 1, said bolt having a fluid passage formed therein establishing fluid communication between the fluid passage of said module and said inlet passage of said valve, said bolt also retaining said module in physical assembly with said valve.

4. In a wellhead structure as set forth in claim 1 one of said modules being on input module and having inlet apertures for each of said valves, said inlet apertures being disposed in fluid communication with a controllable source of pressurized hydraulic fluid, one of said inlet apertures being in fluid communication with the hydraulic fluid passage of said module, each of said inlet apertures terminating in generally parallel conduit connection passages, said conduit connection passages having a generally cylindrical sealing surface and having an inner threaded portion, fluid transfer conduits extending from said conduit connection passages of said input module and establishing fluid communication with the hydraulic fluid passage of the other modules.

5. A control system for a plurality of valves each having a hydraulic operator for controlling the flow of fluid through the valves, inlet passages formed in each of the valves through which fluid may be introduced to effect actuation of the associated hydraulic operator, a plurality of modules disposed one adjacent each of said valves, each of said modules having at least one fluid passage formed therein and having a transverse bore extending therethrough, means establishing fluid communication between said fluid passage and said transverse bore, means establishing fluid communication between said transverse bore of the module and the inlet passage of the respective valve, one of said modules comprising an input module and having an inlet aperture for each of said valves, hydraulic fluid supply conduits being received in sealed relation in each of said inlet apertures and communicating the inlet apertures with a controllable source of pressurized hydraulic fluid, said inlet apertures of said input module terminating in substantially parallel outlet bores, one of said inlet apertures being in fluid communication with said transverse bore of said input module, means closing the outlet bore of said one inlet aperture, means establishing fluid communication between the hydraulic fluid passage of each of the other modules and one of the outlet bores of said input module.

6. A control system as set forth in claim 5, said means establishing fluid communication between the inlet of each of said other modules and the outlet passages of said input module comprising tubular fluid transfer conduits, the extremities of said tubular fluid transfer conducts being received in sealed relation within the outlet passages of the input module and the hydraulic fluid passage of the other modules.

7. A control system as set forth in claim 6, said fluid transfer conduits being threaded at one extremity thereof and being threadedly received within the inlet or outlet passage of one of said modules, the other extremity of the fluid transfer conduits being of substantially cylindrical configuration and being received in sealed relation within substantially cylindrical bores formed in other modules.

8. A control system as set forth in claim 6, said tubular fluid transfer conduits having left-hand threads at one extremity thereof and right-hand threads at the other extremity thereof whereby the fluid transfer conduits may be simultaneously threaded into two of the modules in a turnbuckle-like manner.

9. A control system as set forth in claim 6, guide passages formed in at least one of said modules, said fluid transfer conduit members extending through said guide passages whereby said tubular fluid transfer conduit members are supported intermediate the extremities thereof.

10. A control system comprising a plurality of mechanical devices having fluid energized motors, each having a fluid system therefor, said system including a controllable source of pressurized fluid, an input module associated with one of said mechanical devices, said input module having a plurality of fluid passages therein one for each of said mechanical devices, means establishing direct fluid communication between one of the fluid passages of said input module and the fluid system of the associated one of said mechanical devices, a plurality of fluid supply conduits each having one extremity thereof communicated with a respective one of said fluid passages of said input module and having the other extremity thereof in fluid communication with said source of pressurized fluid, fluid supply modules associated one with each of said other mechanical devices, each of said fluid supply modules having at least one fluid passage extending therethrough, means communicating the fluid passage of each of said fluid supply modules with the fluid system of the associated mechanical device, fluid transfer means establishing fluid communication between the respective fluid passage of each of said fluid supply modules and an associated one of the fluid passages of the input module, whereby fluid may be introduced from said source of pressurized fluid through said input module to a selected one of the fluid supply modules for selective control of the mechanical devices.

11. A control system as set forth in claim 10, said means establishing direct fluid communication and said means establishing communication between said fluid supply modules and the fluid system of the associated one of said mechanical devices comprising a connection passage extending through the respective module, said connection passage being in fluid communication with said fluid passage, a bolt member for each of said modules extending through said connection passage and being received by the associated mechanical device thereby physically connecting the respective module to the associated mechanical device, each of said bolt members having a fluid passage formed therein establishing fluid communication between said connection passage and the fluid system of the associated mechanical device.

12. A control system as set forth in claim 10, the various fluid passages and guide bores in each of said modules being symmetrically located with respect to the connection passage of the respective module, whereby the modules are each subject to orientation in a number of positions relative to the mechanical device and relative to the other modules of the control system thereby promoting flexibility and adaptability of the control system.

13. A control system as set forth in claim 10, said fluid transfer means comprising fluid transfer conduits being received in sealed relation with a respective one of the fluid passages of said input module and the fluid passage of a respective one of said fluid supply modules.

14. A control system as set forth in claim 13, guide passages formed in at least one of said fluid supply modules, one or more of said fluid transfer conduits extending through said guide passages whereby said conduits are supported intermediate the extremities thereof to prevent external damage thereto.

15. A control system comprising a plurality of mechanical devices having fluid energized motors for actuation thereof, said motors each having a fluid system for conducting fluid to and from said motors during energization thereof, said system including primary and secondary sources of controlling fluid under pressure, input modules associated with at least two of said mechanical devices, said input modules each having fluid passages therein for each of said mechanical devices, a plurality of supply conduits extending from said primary source of controlling fluid and being received in fluid communication with the fluid passages of one of said input modules, a plurality of supply conduits extending from said secondary source of controlling fluid and being received in fluid communication with the fluid passages of the other of said input modules, means establishing direct fluid communication between one of the fluid passages of each input module and the fluid system of the associated one of said mechanical devices, fluid supply modules associated one with each of the other mechanical devices, each of said fluid supply modules having a fluid passage formed therein, connection means communicating said fluid passage of said fluid supply modules with the fluid system of the associated mechanical device, means maintaining one of the fluid passages of each of said input modules in fluid communication with the fluid passage of each of said fluid supply and input modules whereby fluid may be communicated from either said primary or secondary sources of pressurized fluid for selective operation of the mechanical devices associated with either said input modules or said fluid supply modules.

16. A control system as set forth in claim 15, said means establishing direct communication and said connection means comprising a connection passage formed in each of said modules and being in fluid communication with the fluid passage of the respective module, a bolt member for each module, said bolt members extending through the respective connection passage and being received by the associated mechanical device thereby physically connecting the respective module to the associated mechanical device, each of said bolt members having a fluid passage formed therein and establishing fluid communication between said connection passage and the fluid system of the associated mechanical device.

References Cited

UNITED STATES PATENTS

| | | | |
|---|---|---|---|
| 2,062,849 | 12/1936 | Warnke | 137—624.18 X |
| 2,360,321 | 10/1944 | Griswold | 137—624.18 X |
| 3,319,654 | 5/1967 | Faldi | 137—624.18 X |

FOREIGN PATENTS 713,363   7/1965   Canada.

ARNOLD ROSENTHAL, Primary Examiner

U.S. Cl. X.R.

91—411; 251—367